US011580327B2

(12) United States Patent
Zhang

(10) Patent No.: US 11,580,327 B2
(45) Date of Patent: Feb. 14, 2023

(54) IMAGE DENOISING MODEL TRAINING METHOD, IMAGING DENOISING METHOD, DEVICES AND STORAGE MEDIUM

(71) Applicant: Beijing Xiaomi Pinecone Electronics Co., Ltd., Beijing (CN)

(72) Inventor: Liang Zhang, Beijing (CN)

(73) Assignee: Beijing Xiaomi Pinecone Electronics Co., Ltd., Beijing (CN)

(*) Notice: Subject to any disclaimer, the term of this patent is extended or adjusted under 35 U.S.C. 154(b) by 159 days.

(21) Appl. No.: 17/147,760

(22) Filed: Jan. 13, 2021

(65) Prior Publication Data

US 2021/0390341 A1 Dec. 16, 2021

(30) Foreign Application Priority Data

Jun. 12, 2020 (CN) .......................... 202010534723.5

(51) Int. Cl.
*G06V 10/70* (2022.01)
*G06K 9/62* (2022.01)
(Continued)

(52) U.S. Cl.
CPC ............ *G06K 9/6256* (2013.01); *G06T 5/002* (2013.01); *G06T 5/50* (2013.01); *G06N 3/04* (2013.01); *G06N 3/08* (2013.01)

(58) Field of Classification Search
CPC .. G06K 9/6256; G06K 9/6297; G06K 7/1482; G06T 5/002; G06T 5/50;
(Continued)

(56) References Cited

U.S. PATENT DOCUMENTS

2010/0020208 A1 1/2010 Barbu
2011/0194763 A1* 8/2011 Moon .................... G06T 5/002
382/167
(Continued)

FOREIGN PATENT DOCUMENTS

CN 109214990 A 1/2019
CN 110072051 A 7/2019
(Continued)

OTHER PUBLICATIONS

Notice of Allowance dated Apr. 5, 2022, in corresponding Korean Application No. 10-2021-0007775, 3 pages.
(Continued)

*Primary Examiner* — Jose L Couso
(74) *Attorney, Agent, or Firm* — Oblon, McClelland, Maier & Neustadt, L.L.P.

(57) ABSTRACT

A training method for an image denoising model that can include collecting multiple sample image groups through a shooting device, each sample image group including multiple frames of sample images with a same photographic sensitivity and sample images in different sample image groups having different photographic sensitivities. The method can further include acquiring a photographic sensitivity of each sample image group, determining a noise characterization image corresponding to each sample image group based on the photographic sensitivity, determining a training input image group and a target image associated with each sample image group, each training input image group including all or part of sample images in a corresponding sample image group and a corresponding noise characterization image, constructing multiple training pairs each including a training input image group and a target image, and training the image denoising model based on the
(Continued)

multiple training pairs until the image denoising model converges.

20 Claims, 5 Drawing Sheets

(51) Int. Cl.
*G06T 5/00* (2006.01)
*G06T 5/50* (2006.01)
*G06N 3/04* (2023.01)
*G06N 3/08* (2023.01)

(58) Field of Classification Search
CPC . G06T 2207/20081; G06T 2207/20084; G06T 3/40; G06T 2207/202021; G06T 2207/10016; G06T 7/44; G06T 5/001; G06T 2207/20076; G06T 3/4046; G06T 9/002; G06N 3/04; G06N 3/0454; G06N 3/02; G06N 3/08–088; G06N 7/00; G06N 20/00; G06V 10/30; G06V 10/40; G06V 10/454; G06V 10/82; G06V 30/18057; H04N 5/357; H04N 5/2355
See application file for complete search history.

(56) References Cited

U.S. PATENT DOCUMENTS

| | | | |
|---|---|---|---|
| 2013/0128056 A1* | 5/2013 | Chuang | H04N 17/002 |
| | | | 382/305 |
| 2017/0278546 A1* | 9/2017 | Xiao | G06T 5/00 |
| 2018/0357753 A1 | 12/2018 | Lehtinen et al. | |
| 2020/0051217 A1 | 2/2020 | Shen et al. | |
| 2020/0051260 A1 | 2/2020 | Shen et al. | |
| 2020/0082508 A1 | 3/2020 | Alletto et al. | |

FOREIGN PATENT DOCUMENTS

| | | |
|---|---|---|
| CN | 110163827 A | 8/2019 |
| CN | 110166709 A | 8/2019 |
| CN | 110191291 A | 8/2019 |
| CN | 111275653 A | 6/2020 |
| EP | 3 620 989 A1 | 3/2020 |

OTHER PUBLICATIONS

Extended European Search Report dated Aug. 2, 2021 in corresponding European Patent Application No. 21155379.7, 8 pages.
Indian Office Action dated Jan. 12, 2022 in Indian Patent Application No. 202144003414, 8 pages.
Japanese Office Action dated Feb. 22, 2022 in Japanese Patent Application No. 2021-004769 (with English translation), 5 pages.

* cited by examiner

IMAGE DENOISING MODEL TRAINING METHOD, IMAGING DENOISING METHOD, DEVICES AND STORAGE MEDIUM

CROSS-REFERENCE TO RELATED APPLICATION

This application is based upon and claims priority to Chinese patent application No. CN202010534723.5, filed on Jun. 12, 2020, the entire contents of which are incorporated herein by reference.

TECHNICAL FIELD

The present disclosure generally relates to a data processing technology for mobile terminals, including to a training method for an image denoising model, an image denoising method, devices and a storage medium.

BACKGROUND

Mobile terminals generally have a photographing function. The insufficient sampling rate of image sensors in the mobile terminals and noise from various aspects of image acquisition, transmission, compression, and the like usually lead to detail loss and excessive color noise of images photographed by the mobile terminals. Images and videos taken in low light environments also have such problems, and the problems are more severe in images taken by smart phones with small aperture cameras. In addition, the aliasing phenomenon may be also caused when a sampling rate is low in an image acquisition process. With the increasing demand of users for a better image effect, how to further improve image resolution, enrich image details, and reduce image noise can be a technical problem that needs to be solved.

SUMMARY

The present disclosure provides a training method and devices for an image denoising model, an image denoising method and device, and a storage medium.

According to a first aspect of the present disclosure, a training method for an image denoising model is provided. The method can include collecting multiple sample image groups through a shooting device, wherein each sample image group includes multiple frames of sample images with a same photographic sensitivity and sample images in different sample image groups have different photographic sensitivities. Further, the method can include acquiring a photographic sensitivity of each sample image group, determining a noise characterization image corresponding to each sample image group based on the photographic sensitivity, and determining a training input image group and a target image which are associated with each sample image group, each training input image group comprising all or part of sample images in a corresponding sample image group and a corresponding noise characterization image. Additionally, the method can include constructing multiple training pairs, each training pair comprising a training input image group and a corresponding target image, and training the image denoising model based on the multiple training pairs until the image denoising model converges.

According to a second aspect of the present disclosure, a multi-frame image denoising method is provided, which may include collecting an image group to be processed comprising multiple continuous frames of images through a shooting device, and acquiring a photographic sensitivity of the image group to be processed, and determining a noise characterization image corresponding to the image group to be processed based on the photographic sensitivity. The method can also include inputting the image group to be processed and the noise characterization image to a multi-frame image denoising model trained through the training method described above, and outputting a target denoised image corresponding to the image group to be processed from the multi-frame image denoising model.

In an implementation mode, the determining the noise characterization image corresponding to the image group to be processed based on the photographic sensitivity may include multiplying the photographic sensitivity by an adaptation coefficient input by a user to obtain an adaptively adjusted photographic sensitivity, and determining the noise characterization image corresponding to the image group to be processed based on the adaptively adjusted photographic sensitivity.

According to a third aspect of the present disclosure, a training device for an image denoising model is provided, which may include a first collection module that is configured to collect multiple sample image groups through a shooting device, each sample image group including multiple frames of sample images with a same photographic sensitivity and the sample images in different sample image groups having different photographic sensitivities. The device can further include an acquisition module that is configured to acquire a photographic sensitivity of each sample image group, and a first determination module that is configured to determine a noise characterization image corresponding to each sample image group based on the photographic sensitivity. Additionally, the device can include a second determination module that is configured to determine a training input image group and a target image which are associated with each sample image group, each training input image group including all or part of sample images in a corresponding sample image group and a corresponding noise characterization image, a construction module that is configured to construct multiple training pairs, each training pair including a training input image group and a corresponding target image, and a training module that is configured to train the image denoising model based on the multiple training pairs until the image denoising model converges.

According to a fourth aspect of the embodiments of the present disclosure, a multi-frame image denoising device is provided, which may include a second collection module that is configured to collect an image group to be processed including multiple continuous frames of images through a shooting device and acquire a photographic sensitivity of the image group to be processed, and a third determination module, configured to determine a noise characterization image corresponding to the image group to be processed based on the photographic sensitivity. The device can further include an input module that is configured to input the image group to be processed and the corresponding noise characterization image to a multi-frame image denoising model trained through the abovementioned training method, and an output module that is configured to output a target denoised image corresponding to the image group to be processed from the multi-frame image denoising model.

According to a fifth aspect of the present disclosure, an image processing device is provided, which may include a processor and a memory that is configured to store instructions executable by the processor. The processor may be configured to execute the executable instructions in the memory to implement the steps of the method.

According to a sixth aspect of the present disclosure, a non-transitory computer-readable storage medium is provided, in which executable instructions may be stored and which is characterized in that the instructions are executable by a processor to implement the steps of the above methods.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate exemplary embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
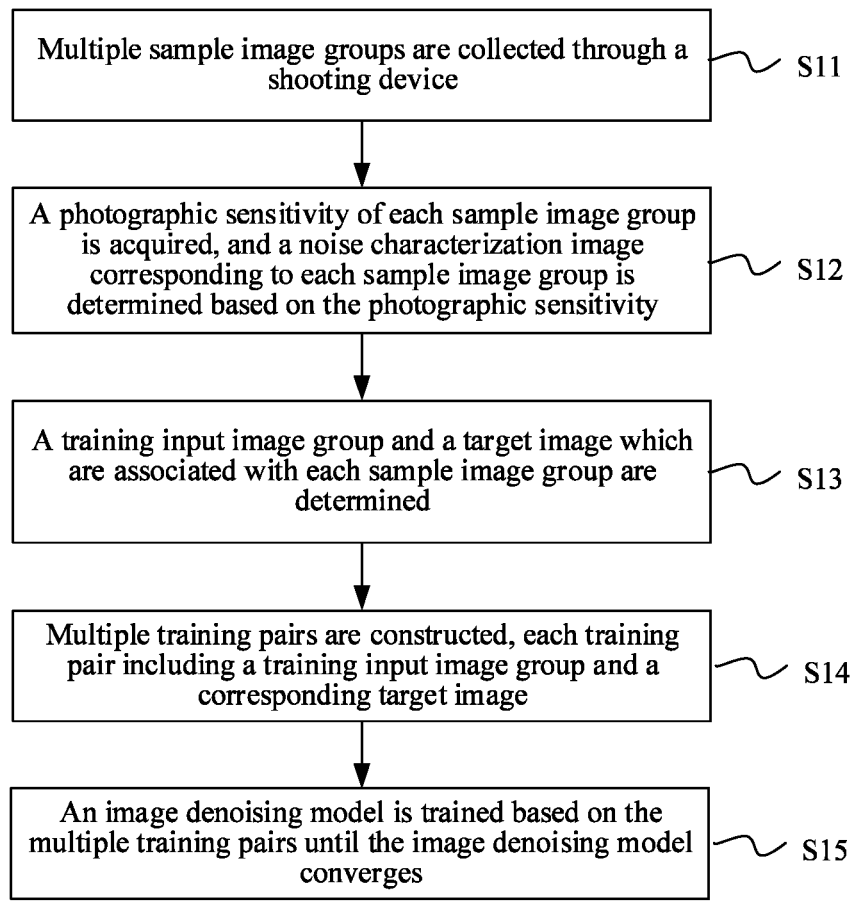
FIG. 1 is a flowchart of a training method for an image denoising model according to an exemplary embodiment.

The embodiments of the present disclosure provide a training method for an image denoising model. FIG. 1 is a flowchart of a training method for an image denoising model according to an exemplary embodiment. As shown in FIG. 1, the method includes the following steps.

In step S11, multiple sample image groups are collected through a shooting device; each sample image group includes multiple frames of sample images with the same photographic sensitivity and sample images in different sample image groups have different photographic sensitivities.

In step S12, a photographic sensitivity of each sample image group is acquired, and a noise characterization image corresponding to each sample image group is determined based on the photographic sensitivity.

In step S13, a training input image group and a target image which are associated with each sample image group are determined; each training input image group includes all or part of sample images in a corresponding sample image group and a corresponding noise characterization image.

In step S14, multiple training pairs are constructed, each training pair including a training input image group and a corresponding target image.

In step S15, an image denoising model is trained based on the multiple training pairs until the image denoising model converges.

In the embodiment, based on the characteristics that a photographic sensitivity of an image is approximately directly proportional to a noise and that photographic sensitivity information is directly provided by a sensor without human intervention and thus is accurate and reliable, the photographic sensitivity information of the image is determined as a part of training input data of the image denoising model, so that the image denoising model can learn noise information of more dimensions, and after the image denoising model is successfully trained, image noises can be effectively removed. Moreover, a noisy sample image in a real scenario rather than an artificially simulated noisy image is adopted, so that the image denoising model can learn real noises, and the denoising capability is further improved.

The embodiments of the present disclosure provide a training method for an image denoising model. The method includes the method shown in FIG. 1. Moreover, the operation in step S13 that the target image associated with each sample image group is determined may include one of the following operations.

A first operation an average of pixels at the same position is calculated based on each sample image in each sample image group to obtain the target image.

A second operation a weighted average of pixels at the same position is calculated based on each sample image in each sample image group to obtain the target image.

A third operation a first frame of sample image or a last frame of sample image is selected from each sample image group as a reference image, a feature point is calculated based on each sample image in each sample image group, a feature point alignment operation is executed on other sample images in each sample image group based on the reference image, and multi-frame image fusion is performed on the sample images subjected to the alignment operation to obtain the target image.

A fourth operation a sample image with a highest resolution is selected from each sample image group as the reference image, a feature point is calculated based on each sample image in each sample image group, a feature point alignment operation is executed on other sample images in each sample image group based on the reference image, and multi-frame image fusion is performed on the sample images subjected to the alignment operation to obtain the target image.

A method for calculating a resolution of a sample image may include that gradient values of all the images are obtained through a Laplace operator, a gradient value of each image is calculated, and the resolution is determined based on the gradient value, the gradient value being directly proportional to the resolution. Selecting a sample image with the highest resolution refers to selecting a sample image with a maximum gradient value.

After the reference image is determined, the other input images may be made to be aligned with the reference image based on the feature point and an optical flow method. Fusion processing may be performed after alignment. A difference between pixels at the same position may be calculated in a fusion process. The difference being usually generated by a difference caused by a noise and a change of part of contents. A weight during fusion may be determined according to the difference. A difference between the part of contents easily causes generation of an artifact after fusion. The difference of the noise is favorable for denoising. The weight may be adjusted to balance denoising and artifact removal. Noise estimation may be performed on the images to know a noise amplitude of the group of images. When the noise is relatively strong, it is indicated that the difference between the other image and the reference frame is mainly the noise. In this case, the weight of the other image may be properly increased to achieve a good denoising effect after fusion. Otherwise, a relatively low weight is kept to avoid generation of artifacts.

In the embodiment, multiple frames of low-quality sample images may be fused to obtain a high-quality target image. Noise simulation and fuzzy simulation being not involved, so that the target image contains detail features of more sample images, which is favorable for a machine image enhancement model to learn detail features.

The embodiments of the present disclosure provide a training method for an image denoising model. The method includes the method shown in FIG. 1. Moreover, in S11, when the shooting device shoots, the shooting device may be fixed on a firm supporting device (for example, a tripod) for continuous shooting. The sample images in the same sample image group have the same photographic sensitivity, and the sample images in different sample image groups have different photographic sensitivities. For example, the photographic sensitivity may be valued to be 100, 625, and 6,400, etc.

In an implementation mode, the operation in S13 that the training input image group associated with each sample image group is determined may include one of the following manners.

A first manner, the sample image group is determined as the training input image group.

A second manner, part of sample images are selected from the sample image group to form the training input image group.

The selection in the second manner may include one of the following ways where multiple images at middle positions in a shooting sequence are selected, the resolution of each image is calculated, and first multiple images of a preset proportion in a resolution sequence are selected, the resolution of each image is calculated, and a preset number of first multiple images are selected according to the resolution sequence. In an implementation mode, when the number of the sample images in each sample image group is a first fixed number, the number of the selected part of sample images is a second fixed number, the first fixed number being larger than the second fixed number.

For example, 500 photographic sensitivities are involved in step S11. Under each photographic sensitivity, 20 images are continuously shot to form a sample image group. When the first manner is used in step S12, the sample image group is determined as a training input image group, thereby constructing 500 training pairs. Each training pair includes a training input image group, a noise characterization image and a target image. Each training input image group includes 20 sample images. When the second manner is used in step S12, 10 sample images are selected from each sample image group to form a training input image group, thereby constructing 500 training pairs. Each training pair includes a training input image group, a noise characterization image and a target image. Each training input image group includes 20 sample images.

In the embodiment, through the operation that the associated training input image group in each sample image group is determined, options for different compatibilities of the sample images can be provided. When the compatibilities of the sample images are relatively high, the first manner may be used, and all the sample images in the sample image group are used for training. When the compatibilities of the sample images are relatively low, the second manner may be used, the sample images in the sample image group are subjected to screening and the selected sample images are used for training.

The embodiments of the present disclosure also provide a training method for an image denoising model. The method includes the method shown in FIG. 1. The operation in step S13 that the corresponding noise characterization image is determined based on the photographic sensitivity of each sample image group may include that a photographic sensitivity image is constructed, all pixel values of the photographic sensitivity image being a normalized photographic sensitivity of each sample image group, and the photographic sensitivity image is determined as the noise characterization image.

A size of the photographic sensitivity image is the same as a size of the sample image, or, the size of the photographic sensitivity image is different from the size of the sample image.

The method may further include that: the normalized photographic sensitivity is obtained in the following manner: statistics is made on a maximum photographic sensitivity and a minimum photographic sensitivity in the multiple sample image groups, a photographic sensitivity interval is determined based on the maximum photographic sensitivity and the minimum photographic sensitivity, a mapping relationship between the photographic sensitivity interval and an image pixel interval is constructed, and the normalized photographic sensitivity of each sample image group is determined according to the mapping relationship. The image pixel interval is an interval of 0-255.

In the embodiment, each pixel value in the constructed noise characterization image may be the normalized photographic sensitivity of each sample image group, so that the noise characterization image only includes a normalized photographic sensitivity value that is taken as information of one dimension of noise information.

The embodiments of the present disclosure also provide a training method for an image denoising model. The method includes the method shown in FIG. 1. The operation in step S13 that the corresponding noise characterization image is determined based on the photographic sensitivity of each sample image group may include that a photographic sensitivity image is constructed, all pixel values of the photographic sensitivity image being a normalized photographic sensitivity of each sample image group, a grayscale component image of each target image corresponding to each sample image group is acquired, a dot product matrix of the grayscale component image and the photographic sensitivity image is determined, and the dot product matrix is determined as the noise characterization image.

In the embodiment, the constructed noise characterization image is the dot product matrix of the grayscale component image and the photographic sensitivity image, so that the noise characterization image simultaneously contains the photographic sensitivity value and the grayscale component image, which are taken as information of two dimensions of the noise information.

The embodiments of the present disclosure also provide a training method for an image denoising model. The method includes the method shown in FIG. 1. The operation in step S13 that the corresponding noise characterization image is determined based on the photographic sensitivity of each sample image group may include that: a photographic sensitivity image is constructed, all pixel values of the photographic sensitivity image being a normalized photographic sensitivity of each sample image group, a grayscale component image of each target image corresponding to each sample image group is determined, and it is determined that the noise characterization image is a two-dimensional image, the two-dimensional image including the photographic sensitivity image and the grayscale component image.

In the embodiment, the constructed noise characterization image includes two images, i.e., the grayscale component image and the photographic sensitivity image, so that the noise characterization image simultaneously contains the photographic sensitivity value and the grayscale component image which are taken as information of two dimensions of the noise information.

The embodiments of the present disclosure also provide a training method for an image denoising model. The method includes the method shown in FIG. 1. The operation in step S13 that the corresponding noise characterization image is determined based on the photographic sensitivity of each sample image group may include that a photographic sensitivity image is constructed, a first photographic sensitivity value is set according to an image processing requirement, all the pixel values of the photographic sensitivity image being the first photographic sensitivity value, and the photographic sensitivity image is determined as the noise characterized image.

The first photographic sensitivity value is greater than the photographic sensitivity of the sample image group when the image processing requirement is that a denoising requirement is higher than a detail preservation requirement. The first photographic sensitivity value is less than the photographic sensitivity of the sample image group when the image processing requirement is that the denoising requirement is lower than the detail preservation requirement.

Since the photographic sensitivity information represents a noise level of an input image, if the photographic sensitivity value is greater, it is indicated that the noise of the image is greater, and a corresponding model obtained by fitting has a better denoising effect on the corresponding noise image. Therefore, for further denoising the image, the photographic sensitivity value may be increased to enhance the denoising effect, but the cost is a smooth result and loss in detail information. Conversely, more details may be preserved, but the denoising effect may be reduced. In the embodiment, a balance between the denoising requirement and the detail preservation requirement of a model may be adjusted through the photographic sensitivity value such that the model may output an image with relatively high quality.

Figure 2:
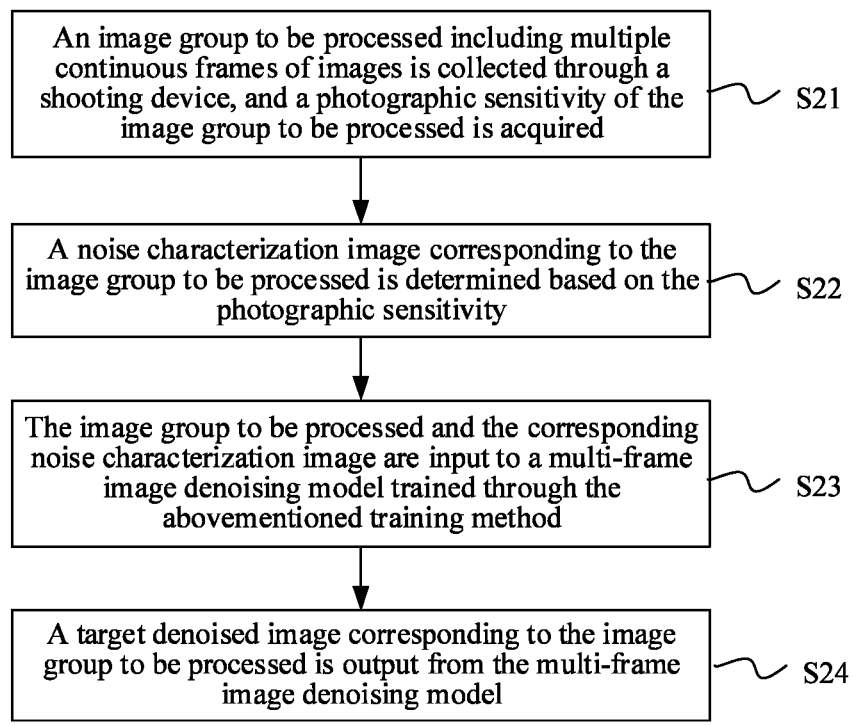
FIG. 2 is a flowchart of a multi-frame image denoising method according to an exemplary embodiment.

The embodiments of the present disclosure provide an image denoising model-based method for multi-frame image denoising. FIG. 2 is a flowchart of an image denoising model-based multi-frame image denoising method according to an exemplary embodiment. As shown in FIG. 2, the method includes the following steps.

In step S21, an image group to be processed including multiple continuous frames of images is collected through a shooting device, and a photographic sensitivity of the image group to be processed is acquired.

In step S22, a noise characterization image corresponding to the image group to be processed is determined based on the photographic sensitivity.

In step S23, the image group to be processed and the corresponding noise characterization image are input to a multi-frame image denoising model trained through the abovementioned training method.

In step S24, a target denoised image corresponding to the image group to be processed is output from the multi-frame image denoising model.

The embodiments of the present disclosure provide a multi-frame image denoising method. The method includes the method shown in FIG. 2. The operation in step S22 that the noise characterization image corresponding to the image group to be processed is determined based on the photographic sensitivity may include that: the photographic sensitivity is multiplied by an adaptation coefficient input by a user to obtain an adaptively adjusted photographic sensitivity, and the noise characterization image corresponding to the image group to be processed is determined based on the adaptively adjusted photographic sensitivity.

In an implementation mode, the successfully trained multi-frame image denoising model may be tested. During testing, test images with different photographic sensitivities are input, denoising effects and detail preservation effects of images output by the image denoising model are checked, and an adaptation coefficient is determined according to the denoising effects and detail preservation effects of the output images. For example, when a user considers that the denoising effect is required to be further improved, the adaptation coefficient may be set to be greater than 1, and when the denoising effect is required to be improved to a greater extent, the adaptation coefficient may be greater. When a user considers that the detail preservation effect is required to be further improved, the adaptation coefficient may be set to be less than 1, and when the detail preservation effect is required to be improved to a greater extent, the adaptation coefficient may be smaller.

In an implementation mode, the operation that the noise characterization image corresponding to the image group to be processed is determined based on the adaptively adjusted photographic sensitivity may include that: a photographic sensitivity image is constructed, all pixel values of the photographic sensitivity image being the adaptively adjusted photographic sensitivity, and the photographic sensitivity image is determined as the noise characterization image corresponding to the image group to be processed.

Descriptions will be made below through an exemplary embodiment as an example.

EXEMPLARY EMBODIMENT

Each sample image group includes 6 Red Green Blue (RGB) images, and a size of a noise characterization image is the same as a size of a sample image. A training input image group includes 19 channels. Each sample image corresponds to a channel. Each channel corresponds to a component image, namely three channels correspond to an R component image, G component image and B component image of a sample image respectively. The 6 RGB images in the sample image group correspond to 18 channels, and the noise characterization image corresponds to 1 channel.

An image denoising system may be a neural network system, for example, a Convolutional Neural Network (CNN). An output of the image denoising model includes 3 channels corresponding to the R component image, the G component image and the B component image respectively, and a finally output result is an RGB image.

When the image denoising model is trained, an adaptive moment estimation (Adam) optimizer with beta1 being 0.5 may be adopted for training. An initial learning rate may be 0.0002, a rate of down-regulation at an interval of 10 epochs may be 0.9, and training may be performed for totally 50 epochs.

An RGB image group to be processed including 6 continuous frames may be collected through a shooting device, a photographic sensitivity 200 of the image group to be processed may be acquired, an adaptation coefficient input by a user may be 1.5, and the photographic sensitivity may be multiplied by the adaptation coefficient to obtain an adaptively adjusted photographic sensitivity 300. A photographic sensitivity image is constructed, all pixel values of the photographic sensitivity image being the adaptively adjusted photographic sensitivity 300, and the photographic sensitivity image is determined as a noise characterization image corresponding to the image group to be processed. The image group to be processed and the corresponding noise characterization image may be input to the successfully trained multi-frame image denoising model. A target denoised image output by the multi-frame image denoising model and corresponding to the image group to be processed may be obtained. The target denoised image is an RGB image.

Figure 3:
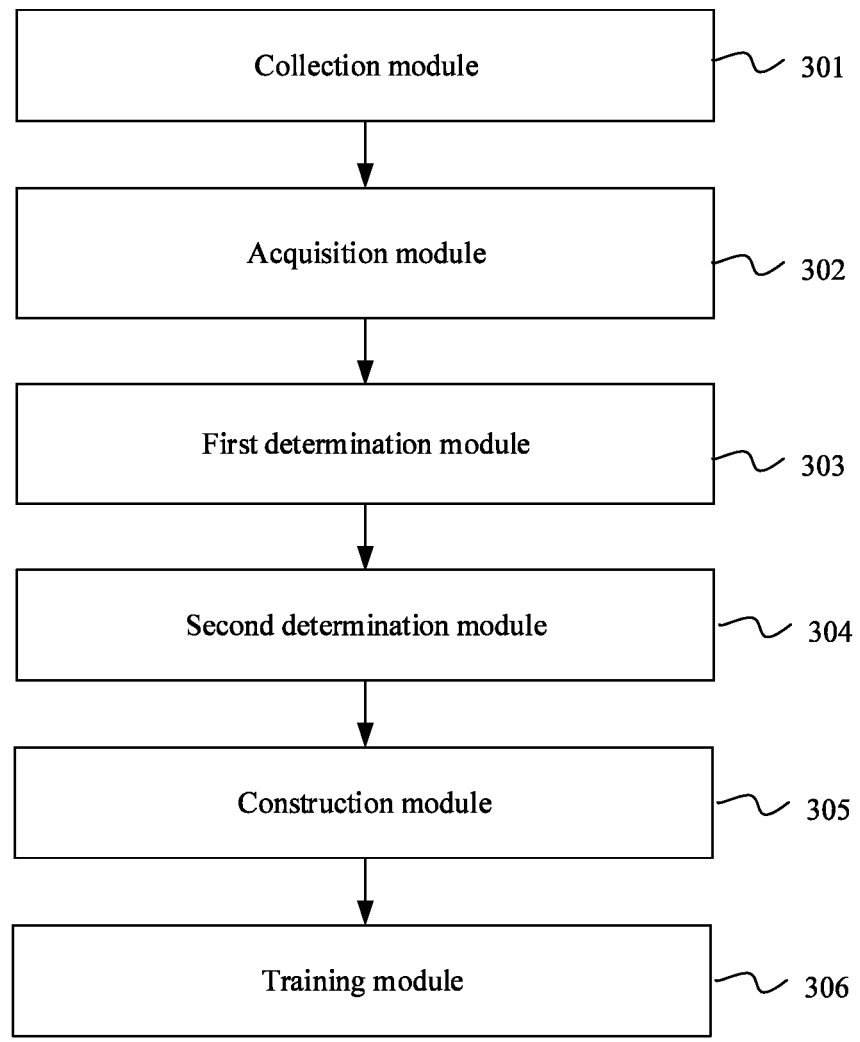
FIG. 3 is a structure diagram of a training device for an image denoising model according to an exemplary embodiment.

The embodiments of the present disclosure provide a training device for an image denoising model. Referring to FIG. 3, FIG. 3 is a structure diagram of a training device for an image denoising model according to an exemplary embodiment. Of course, it should be understood that one or more of the modules described in this disclosure could be implemented by circuitry.

As shown in FIG. 3, the image denoising model training device can include a first collection module 301 that is configured to collect multiple sample image groups through a shooting device, wherein each sample image group includes multiple frames of sample images with the same photographic sensitivity and the sample images in different sample image groups have different photographic sensitivities, and an acquisition module 302 that is configured to acquire the photographic sensitivity of each sample image group. The device can further include a first determination module 303 that is configured to determine a noise characterization image corresponding to each sample image group based on the photographic sensitivity, and a second determination module 304 that is configured to determine a training input image group and a target image which are associated with each sample image group, each training input image group including all or part of sample images in a corresponding sample image group and a corresponding noise characterization image. Additionally, the device can include a construction module 305 that is configured to construct multiple training pairs, each training pair including a training input image group and a corresponding target image, and a training module 306 that is configured to train an image denoising model based on the multiple training pairs until the image denoising model converges.

The embodiments of the present disclosure provide a training device for an image denoising model. The training device includes the modules shown in FIG. 3. The first determination module 303 is configured to determine the noise characterization image corresponding to each sample image group based on the photographic sensitivity by operations of constructing a photographic sensitivity image, all pixel values of the photographic sensitivity image being a normalized photographic sensitivity of each sample image group, and determining the photographic sensitivity image as the noise characterization image.

The embodiments of the present disclosure provide a training device for an image denoising model. The training device includes the modules shown in FIG. 3. The first determination module 303 is configured to determine the noise characterization image corresponding to each sample image group based on the photographic sensitivity by operations of constructing a photographic sensitivity image, all pixel values of the photographic sensitivity image being a normalized photographic sensitivity of each sample image group, acquiring a grayscale component image of each target image corresponding to each sample image group, determining a dot product matrix of the grayscale component image and the photographic sensitivity image, and determining the dot product matrix as the noise characterization image.

The embodiments of the present disclosure provide a training device for an image denoising model. The training device includes the modules shown in FIG. 3. The first determination module 303 is configured to determine the noise characterization image corresponding to each sample image group based on the photographic sensitivity by operations of constructing a photographic sensitivity image, all pixel values of the photographic sensitivity image being a normalized photographic sensitivity of each sample image group, determining a grayscale component image of each target image corresponding to each sample image group, and determining that the noise characterization image is a two-dimensional image, the two-dimensional image comprising the photographic sensitivity image and the grayscale component image.

The embodiments of the present disclosure provide a training device for an image denoising model. The training device includes the modules shown in FIG. 3. the device further includes a normalized photographic sensitivity calculation module, configured to calculate the photographic sensitivity by operations of: making statistics on a maximum photographic sensitivity and a minimum photographic sensitivity in the multiple sample image groups, determining a photographic sensitivity interval based on the maximum photographic sensitivity and the minimum photographic sensitivity, constructing a mapping relationship between the photographic sensitivity interval and an image pixel interval, and determining the normalized photographic sensitivity of each sample image group according to the mapping relationship.

The embodiments of the present disclosure provide a training device for an image denoising model. The training device includes the modules shown in FIG. 3. The second determination module 304 is further configured to determine the target image associated with each sample image group by one of operations of calculating an average of pixels at a same position based on each sample image in each sample image group to obtain the target image, calculating a weighted average of pixels at a same position based on each sample image in each sample image group to obtain the target image, and selecting a sample image with a highest resolution, a first frame of sample image or a last frame of sample image from each sample image group as a reference image, calculating a feature point based on each sample image in each sample image group, executing a feature point alignment operation on the other sample images in each sample image group based on the reference image, and performing multi-frame image fusion on the sample images subjected to the alignment operation to obtain the target image.

Figure 4:
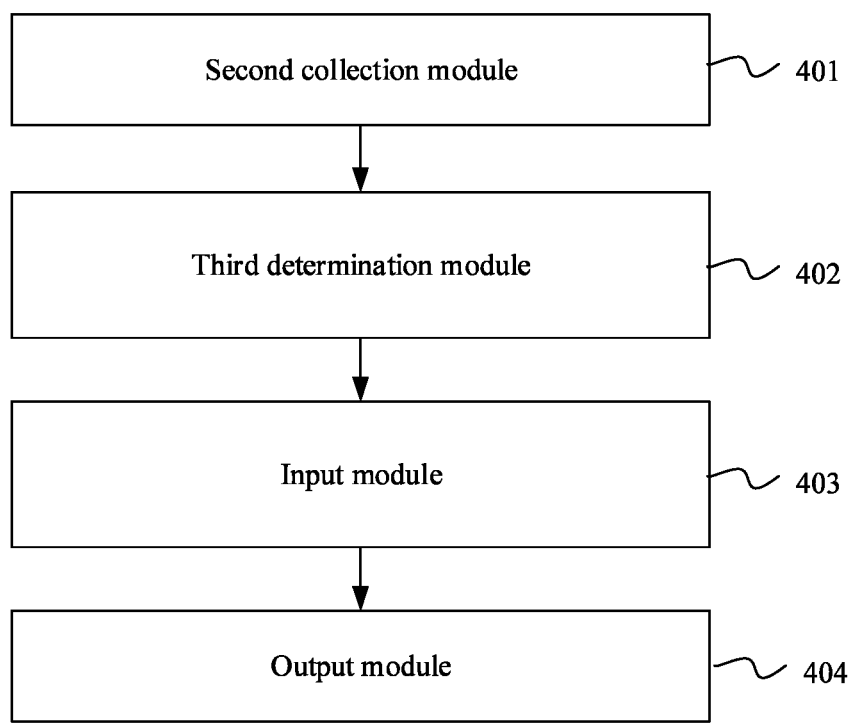
FIG. 4 is a structure diagram of a multi-frame image denoising device according to an exemplary embodiment.

The embodiments of the present disclosure provide a multi-frame image denoising device. Referring to FIG. 4, FIG. 4 is a structure diagram of a multi-frame image denoising device according to an exemplary embodiment. As shown in FIG. 4, the multi-frame image denoising device can include a second collection module 401 that is configured to collect an image group to be processed including multiple continuous frames of images through a shooting device and acquire a photographic sensitivity of the image group to be processed, and a third determination module 402 that is configured to determine a noise characterization image corresponding to the image group to be processed based on the photographic sensitivity. The device can further include an input module 403 that is configured to input the image group to be processed and the corresponding noise characterization image to a multi-frame image denoising model trained by use of the abovementioned training method, and an output module 404 that is configured to output a target denoised image corresponding to the image group to be processed from the multi-frame image denoising model.

The embodiments of the present disclosure provide a multi-frame image denoising device. The device includes the modules shown in FIG. 4. The third determination module 402 is configured to determine the noise characterization image corresponding to the image group to be processed based on the photographic sensitivity by operations of: the photographic sensitivity is multiplied by an adaptation coefficient input by a user to obtain an adaptively adjusted photographic sensitivity, and the noise characterization image corresponding to the image group to be processed is determined based on the adaptively adjusted photographic sensitivity.

In an implementation mode, the determining the noise characterization image corresponding to the image group to be processed based on the adaptively adjusted photographic sensitivity may include: constructing a photographic sensitivity image, all pixel values of the photographic sensitivity image being the adaptively adjusted photographic sensitivity, and determining the photographic sensitivity image as the noise characterization image corresponding to the image group to be processed.

The embodiments of the present disclosure provide an image processing device, which includes a processor and a memory that is configured to store instructions executable by the processor. The processor is configured to execute the executable instructions in the memory to implement the steps of the above methods.

The embodiments of the present disclosure provide a non-transitory computer-readable storage medium, having stored executable instructions thereon that, when executed by a processor, implement the steps of the above methods.

Figure 5:
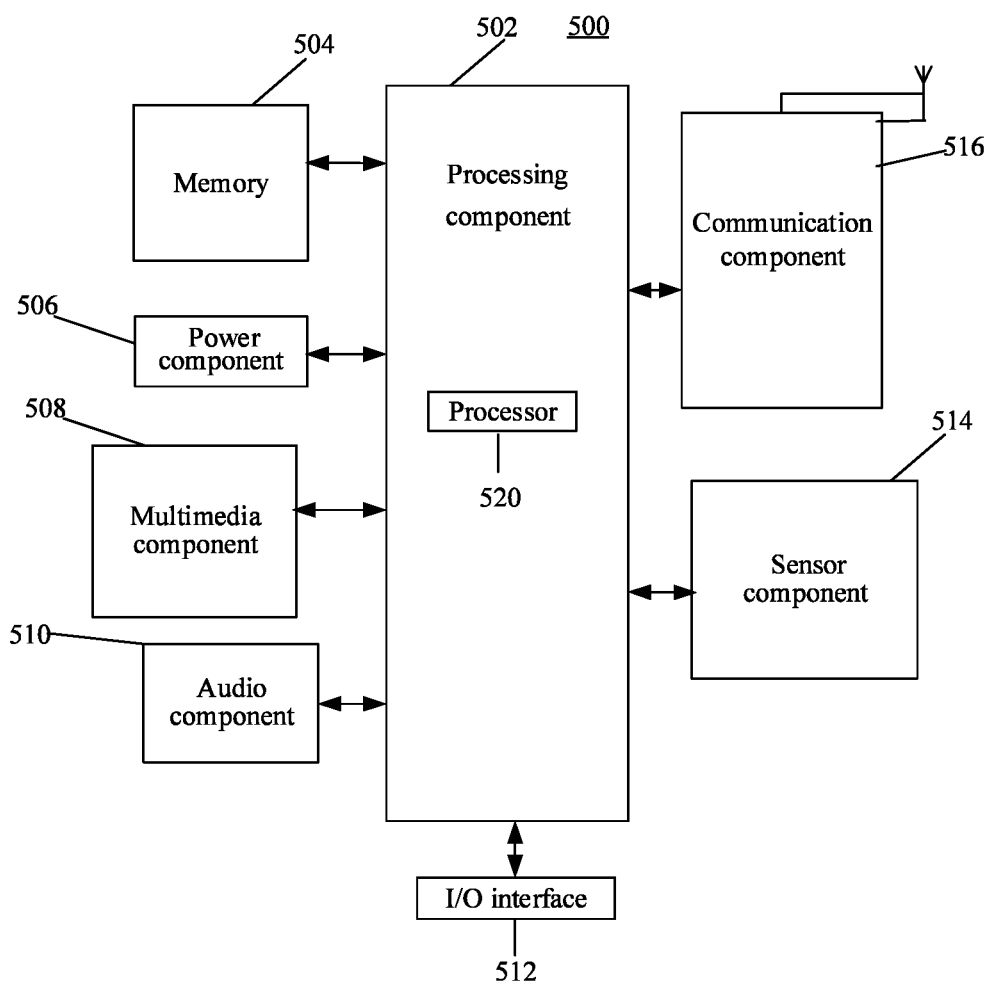
FIG. 5 is a structure diagram of an image processing device according to an exemplary embodiment.

FIG. 5 is a block diagram of an image processing device according to an exemplary embodiment. The image processing device is a training device for an image denoising model or a multi-frame image denoising device. For example, the device 500 may be a mobile phone, a computer, a digital broadcast terminal, a messaging device, a gaming console, a tablet, a medical device, exercise equipment, a personal digital assistant and the like.

Referring to FIG. 5, the device 500 may include one or more of the following components: a processing component 502, a memory 504, a power component 506, a multimedia component 508, an audio component 510, an Input/Output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the steps in the abovementioned method. Moreover, the processing component 502 may include one or more modules which facilitate interaction between the processing component 502 and the other components. For instance, the processing component 502 may include a multimedia module to facilitate interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 506 provides power for various components of the device 500. The power component 506 may include a power management system, one or more power supplies, and other components associated with generation, management and distribution of power for the device 500.

The multimedia component 508 includes a screen providing an output interface between the device 500 and a user. In some embodiments, the screen may include a Liquid Crystal Display (LCD) and a Touch Panel (TP). If the screen includes the TP, the screen may be implemented as a touch screen to receive an input signal from the user. The touch panel includes one or more touch sensors to sense touches, swipes and gestures on the touch panel. The touch sensors may not only sense a boundary of a touch or swipe action but also detect a duration and pressure associated with the touch or swipe action. In some embodiments, the multimedia component 508 includes a front camera and/or a rear camera. The front camera and/or the rear camera may receive external multimedia data when the device 500 is in an operation mode, such as a photographing mode or a video mode. Each of the front camera and the rear camera may be a fixed optical lens system or have focusing and optical zooming capabilities.

The audio component 510 is configured to output and/or input an audio signal. For example, the audio component 510 includes a Microphone (MIC), and the MIC is configured to receive an external audio signal when the device 500 is in the operation mode, such as a call mode, a recording mode and a voice recognition mode. The received audio signal may further be stored in the memory 504 or sent through the communication component 516. In some embodiments, the audio component 510 further includes a speaker configured to output the audio signal.

The I/O interface 512 provides an interface between the processing component 502 and a peripheral interface module, and the peripheral interface module may be a keyboard, a click wheel, a button and the like. The button may include, but not limited to: a home button, a volume button, a starting button and a locking button.

The sensor component 514 includes one or more sensors configured to provide status assessment in various aspects for the device 500. For instance, the sensor component 514 may detect an on/off status of the device 500 and relative positioning of components, such as a display and small keyboard of the device 500, and the sensor component 514 may further detect a change in a position of the device 500 or a component of the device 500, presence or absence of contact between the user and the device 500, orientation or acceleration/deceleration of the device 500 and a change in temperature of the device 500. The sensor component 514 may include a proximity sensor configured to detect presence of an object nearby without any physical contact. The sensor component 514 may also include a light sensor, such as a Complementary Metal Oxide Semiconductor (CMOS) or Charge Coupled Device (CCD) image sensor, configured for use in an imaging application. In some embodiments, the sensor component 514 may also include an acceleration sensor, a gyroscope sensor, a magnetic sensor, a pressure sensor or a temperature sensor.

The communication component 516 is configured to facilitate wired or wireless communication between the device 500 and another device. The device 500 may access any communication-standard-based wireless network, such as a Wi-Fi network, a 2nd-Generation (2G) or 3rd-Generation (3G) network, or any combination thereof. In an exemplary embodiment, the communication component 516 receives a broadcast signal or broadcast associated information from an external broadcast management system through a broadcast channel. In an exemplary embodiment, the communication component 516 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the device 500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 504 including an instruction, and the instruction may be executed by the processor 520 of the device 500 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

The technical solutions provided in the embodiments of the present disclosure have beneficial effects. For example, based on the characteristics that a photographic sensitivity of an image is approximately directly proportional to a noise and that photographic sensitivity information is directly provided by a sensor without human intervention and thus is accurate and reliable, the photographic sensitivity information of the image is determined as a part of data that is input for training the image denoising model, so that the image denoising model can learn noise information of more dimensions, and after the image denoising model is successfully trained, image noises can be effectively removed.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A training method for an image denoising model, comprising:

collecting multiple sample image groups through a shooting device, each of the sample image groups including multiple frames of sample images with a same photographic sensitivity, and sample images in different sample image groups have different photographic sensitivities;

for each of the sample image groups,
    acquiring a photographic sensitivity of the sample image group;
    constructing a photographic sensitivity image based on the photographic sensitivity and determining a noise characterization image corresponding to the sample image group based on the photographic sensitivity image, wherein all pixel values of the photographic sensitivity image are a normalized photographic sensitivity of the sample image group; and
    determining a training input image group and a target image which are associated with the sample image group, the training input image group including all or part of the sample images in the sample image group and the noise characterization image corresponding to the sample image group;

constructing multiple training pairs, each of the training pairs including a training input image group and a corresponding target image; and training the image denoising model based on the multiple training pairs until the image denoising model converges.

2. The training method of claim 1, wherein for each of the sample image groups, determining the noise characterization image corresponding to the sample image group based on the photographic sensitivity image further comprises:
    determining the photographic sensitivity image as the noise characterization image.

3. The training method of claim 1, wherein for each of the sample image groups, determining the noise characterization image corresponding to the sample image group based on the photographic sensitivity image further comprises:
    for each of the sample image groups, acquiring a grayscale component image of the target image corresponding to the sample image group, determining a dot product matrix of the grayscale component image and the photographic sensitivity image, and determining the dot product matrix as the noise characterization image.

4. The training method of claim 1, wherein for each of the sample image groups, determining the noise characterization image corresponding to the sample image group based on the photographic sensitivity image further comprises:
    for each of the sample image groups, determining a grayscale component image of the target image corresponding to the sample image group; and
    determining that the noise characterization image is a two-dimensional image having the photographic sensitivity image and the grayscale component image.

5. The training method of claim 1, wherein the normalized photographic sensitivity is obtained by:
   making statistics on a maximum photographic sensitivity and a minimum photographic sensitivity in the multiple sample image groups, determining a photographic sensitivity interval based on the maximum photographic sensitivity and the minimum photographic sensitivity, constructing a mapping relationship between the photographic sensitivity interval and an image pixel interval, and for each of the sample image groups, determining the normalized photographic sensitivity of the sample image group based on the mapping relationship.

6. The training method of claim 1, wherein for each of the sample image groups, determining the target image associated with the sample image group comprises one of following operations:
   for each of the sample image groups,
   calculating an average of pixels at a same position based on a sample image in the sample image group to obtain the target image;
   calculating a weighted average of pixels at a same position based on the sample image in the sample image group to obtain the target image; and
   selecting a sample image with a highest resolution, a first frame of sample image or a last frame of sample image from the sample image group as a reference image, calculating a feature point based on the sample image in the sample image group, executing a feature point alignment operation on other sample images in the sample image group based on the reference image, and performing multi-frame image fusion on the sample images subjected to the alignment operation to obtain the target image.

7. A multi-frame image denoising method, comprising:
   collecting an image group to be processed including multiple continuous frames of images through a shooting device, and acquiring a photographic sensitivity of the image group to be processed;
   determining a noise characterization image corresponding to the image group to be processed based on the photographic sensitivity;
   inputting the image group to be processed and the noise characterization image to a multi-frame image denoising model trained through the training method recited in claim 1; and
   outputting a target denoised image corresponding to the image group to be processed from the multi-frame image denoising model.

8. The multi-frame image denoising method of claim 7, wherein determining the noise characterization image corresponding to the image group to be processed based on the photographic sensitivity further comprises:
   multiplying the photographic sensitivity by an adaptation coefficient input by a user to obtain an adaptively adjusted photographic sensitivity; and
   determining the noise characterization image corresponding to the image group to be processed based on the adaptively adjusted photographic sensitivity.

9. The multi-frame image denoising method of claim 8, wherein determining the noise characterization image corresponding to the image group to be processed based on the adaptively adjusted photographic sensitivity further comprises:
   constructing a photographic sensitivity image where all pixel values of the photographic sensitivity image are the adaptively adjusted photographic sensitivity, and
   determining the photographic sensitivity image as the noise characterization image corresponding to the image group to be processed.

10. A training device for an image denoising model, comprising:
    a processor; and
    a memory that is configured to store instructions executable by the processor,
    wherein the processor is configured to:
    collect multiple sample image groups through a shooting device, each of the sample image groups including multiple frames of sample images with a same photographic sensitivity, and sample images in different sample image groups have different photographic sensitivities;
    for each of the sample image groups,
       acquire a photographic sensitivity of the sample image group;
       construct a photographic sensitivity image based on the photographic sensitivity and determine a noise characterization image corresponding to the sample image group based on the photographic sensitivity image, wherein all pixel values of the photographic sensitivity image are a normalized photographic sensitivity of each sample image group; and
       determine a training input image group and a target image which are associated with the sample image group, the training input image group including all or part of sample images in the sample image group and the noise characterization image corresponding to the sample image group;
    construct multiple training pairs, each of the training pairs including a training input image group and a corresponding target image; and
    train the image denoising model based on the multiple training pairs until the image denoising model converges.

11. The training device of claim 10, wherein the processor is further configured to, for each of the sample image groups, determine the noise characterization image corresponding to the sample image group based on the photographic sensitivity image by:
    determining the photographic sensitivity image as the noise characterization image.

12. The training device of claim 10, wherein the processor is further configured to, for each of the sample image groups, determine the noise characterization image corresponding to the sample image group based on the photographic sensitivity image by:
    for each of the sample image groups, acquiring a grayscale component image of the target image corresponding to the sample image group,
    determining a dot product matrix of the grayscale component image and the photographic sensitivity image, and
    determining the dot product matrix as the noise characterization image.

13. The training device of claim 10, wherein the processor is further configured to, for each of the sample image groups, determine the noise characterization image corresponding to the sample image group based on the photographic sensitivity image by:
    for each of the sample image groups, determining a grayscale component image of the target image corresponding to the sample image group, and determining that the noise characterization image is a two-dimensional image including the photographic sensitivity image and the grayscale component image.

14. The training device of claim 10, wherein the process is further configured to calculate the photographic sensitivity by:
making statistics on a maximum photographic sensitivity and a minimum photographic sensitivity in the multiple sample image groups, determining a photographic sensitivity interval based on the maximum photographic sensitivity and the minimum photographic sensitivity, constructing a mapping relationship between the photographic sensitivity interval and an image pixel interval, and for each of the sample image groups, determining the normalized photographic sensitivity of the sample image group according to the mapping relationship.

15. The training device of claim 10, wherein the processor is further configured to determine the target image associated with the sample image group by one of:
for each of the sample image groups,
calculating an average of pixels at a same position based on a sample image in the sample image group to obtain the target image;
calculating a weighted average of pixels at a same position based on the sample image in the sample image group to obtain the target image; and
selecting a sample image with a highest resolution, a first frame of sample image or a last frame of sample image from the sample image group as a reference image, calculating a feature point based on the sample image in the sample image group, executing a feature point alignment operation on the other sample images in the sample image group based on the reference image, and performing multi-frame image fusion on the sample images subjected to the alignment operation to obtain the target image.

16. A multi-frame image denoising device, comprising:
a processor; and
a memory configured to store instructions executable by the processor,
wherein the processor is configured to implement the method of claim 7.

17. The multi-frame image denoising device of claim 16, wherein the processor is further configured to determine the noise characterization image corresponding to the image group to be processed based on the photographic sensitivity by:
multiplying the photographic sensitivity by an adaptation coefficient input by a user to obtain an adaptively adjusted photographic sensitivity, and
determining the noise characterization image corresponding to the image group to be processed based on the adaptively adjusted photographic sensitivity.

18. The multi-frame image denoising device of claim 17, wherein determining the noise characterization image corresponding to the image group to be processed based on the adaptively adjusted photographic sensitivity further comprises:
constructing a photographic sensitivity image where all pixel values of the photographic sensitivity image are the adaptively adjusted photographic sensitivity, and
determining the photographic sensitivity image as the noise characterization image corresponding to the image group to be processed.

19. A non-transitory computer-readable storage medium having stored executable instructions thereon that, when executed by a processor, implement the steps of the method of claim 1.

20. A non-transitory computer-readable storage medium having stored executable instructions thereon that, when executed by a processor, implement the steps of the method of claim 7.

* * * * *